AUTOMATIC TELEPHONE EXCHANGE

Filed Sept. 10, 1963 4 Sheets-Sheet 1

INVENTORS
O.E. EKBERGH
P.G. JONSSON
BY Phillip A. Weiss
ATTORNEY

AUTOMATIC TELEPHONE EXCHANGE

Filed Sept. 10, 1963 4 Sheets-Sheet 2

AUTOMATIC TELEPHONE EXCHANGE

Filed Sept. 10, 1963 4 Sheets-Sheet 4

United States Patent Office 3,317,676

Patented May 2, 1967

3,317,676

AUTOMATIC TELEPHONE EXCHANGE

Oscar Evert Ekbergh, Hagersten, and Per Gustaf Jonsson, Soerlid, Roenninge, Sweden, assignors to International Standard Electric Corporation, New York, N.Y., a corporation of Delaware Filed Sept. 10, 1963, Ser. No. 307,945

Claims priority, application Sweden, Sept. 10, 1962, 9,730/62

10 Claims. (Cl. 179—22)

This invention relates to automatic telephone exchanges and more particularly to switching arrangements for use in such exchanges.

Exchanges of the type described herein extend connections through a multiswitch matrix of crosspoints. Many forms of multiswitches could be used, such as matrices comprising glass reed relay contacts or even semiconductor crosspoints; however, the invention is here described as using crossbar switches.

Known automatic telephone exchanges use crossbar switches in a network arrangement of primary and secondary switches to minimize the number of crosspoints required for enabling the simultaneous connection of a plurality of calls through the exchange. Input conductors, such as subscriber lines, are connected to the primary switches. Output conductors such as trunk lines are connected to the secondary switches. Thus, at least one primary switch and one secondary switch on the line side and another primary switch and secondary switch on the trunk side are required to complete a call through an exchange.

The crossbar switches are all complete units of standard sizes having their own control components, such as select magnets. Therefore, while the conventional network of primary-secondary switch arrangements have proven economical in the use of crosspoints, such arrangements are not necessarily economical in the use of components for controlling the crosspoints. For example, conventional network arrangements may require eight switches with all of their magnets while the number of lines actually served by the network might require only the number of crosspoints and magnets that are found on four switches. In the many previous attempts that have been made to combine primary and secondary switches to minimize the number of control components and crosspoints required have been thwarted by traffic flow considerations.

Accordingly, an object of this invention is to provide a new and improved telephone exchange switching arrangement.

A further object of this invention is to provide an automatic telephone exchange switching arrangement wherein the crosspoint controls required are minimized as well as the number of crosspoints required.

Yet another object of this invention is to provide a primary-secondary multiswitch arrangement wherein secondary switches share the control components of pirmary switches.

A related object of this invention is to provide a switching arrangement wherein input conductors and output conductors are connected directly to the same verticals on a multiswitch.

A further object of this invention is to provide automatic telephone exchanges using a multiswitch arrangement for interconnecting subscriber lines and trunk lines wherein a minimum of crosspoints and crosspoint control components are used and traffic flow is not thereby impaired.

In accordance with one aspect of this invention, an automatic telephone exchange is provided for interconnecting a plurlaity of subscriber stations via a group of multiswitches having horizontal and vertical paths. Any one of the vertical paths may be connected with any one of the horizontal paths. Each vertical path (comprised of a plurality of multiples) is equipped with a plurality of groups of spring contacts at each horizontal level. At least one group of such spring contacts is used for connecting incoming lines to the vertical path while at least another of said groups of spring contacts is used to connect trunks to the same vertical path. The groups of contacts connected to the lines and the groups of contacts connected to the trunks are individually coupled to separate outputs through the same vertical path. Thus, the selection of the individual trunk or line is under the control of different select bars on the same multiswitch. Therefore, it follows that, a primary-to-secondary type connection is accomplished by using one vertical multiple. This results in an exchange which may require as few as one-half of the switch components as were used in prior exchanges.

The above mentioned and other objects and features of this invention and the manner of obtaining them will become more apparent, and the invention itself will be best undertood by reference to the following description of an embodiment of the invention taken in conjuction with the accompanying drawings in which.

Figures 4, 6:
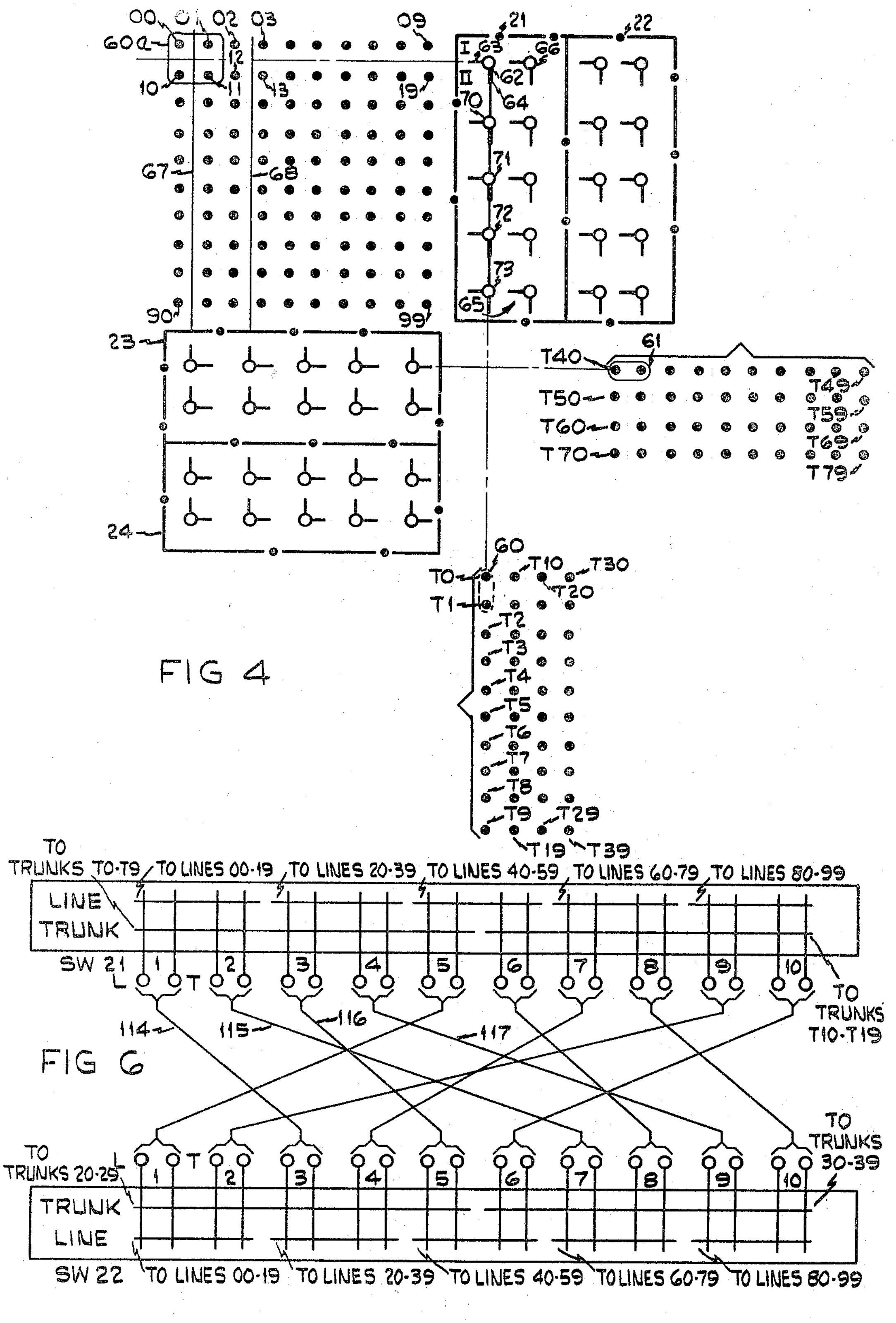
Figure 5:
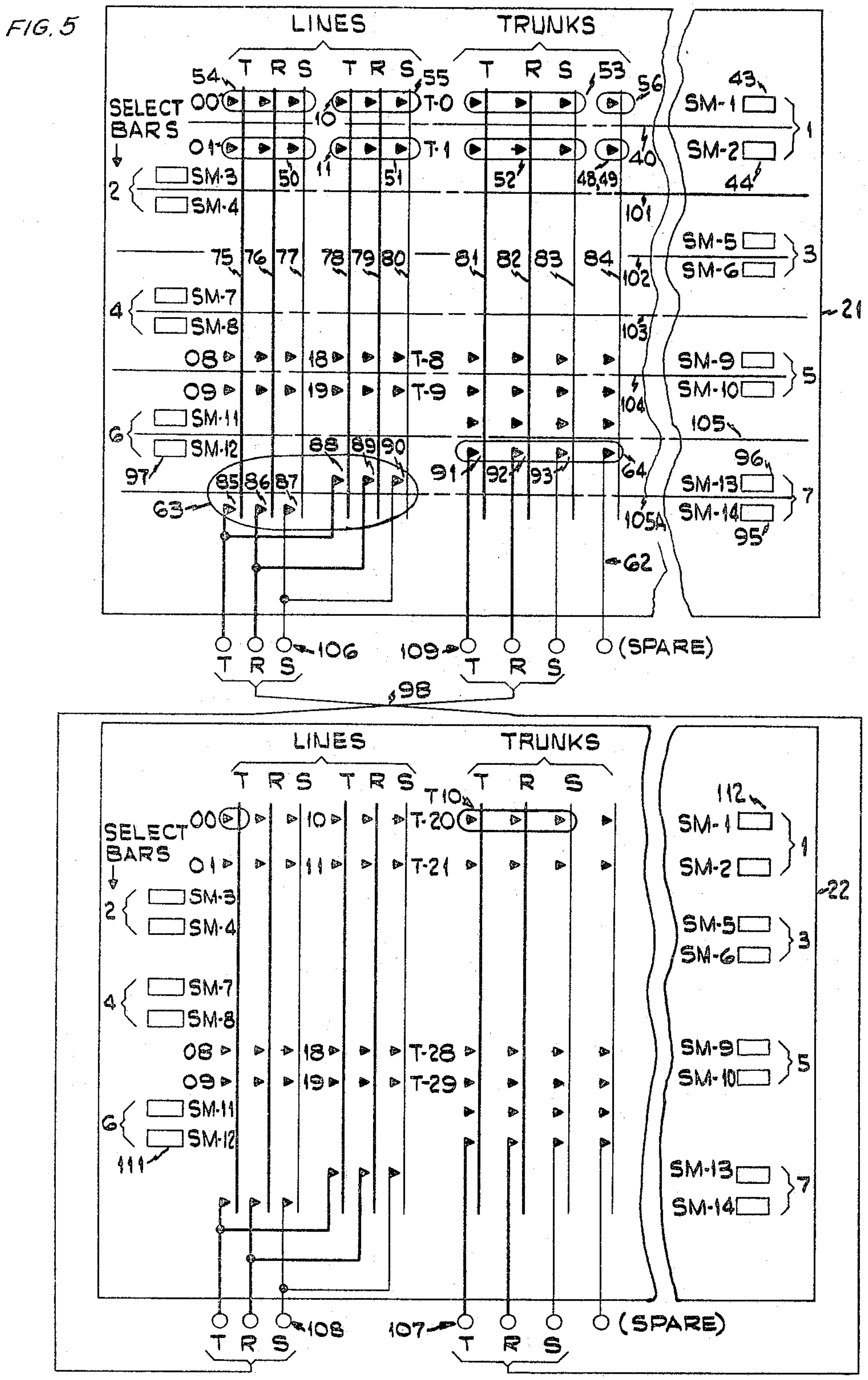

FIG. 4 schematically shows the switching arrangement made in accordance with the invention;

FIG. 5 schematically shows one vertical multiple on each of two switches connected in accordance with the inventive arrangement; and FIG. 6 schematically shows a method of coupling the switches by a slip multiple arrangement.

Figure 1:
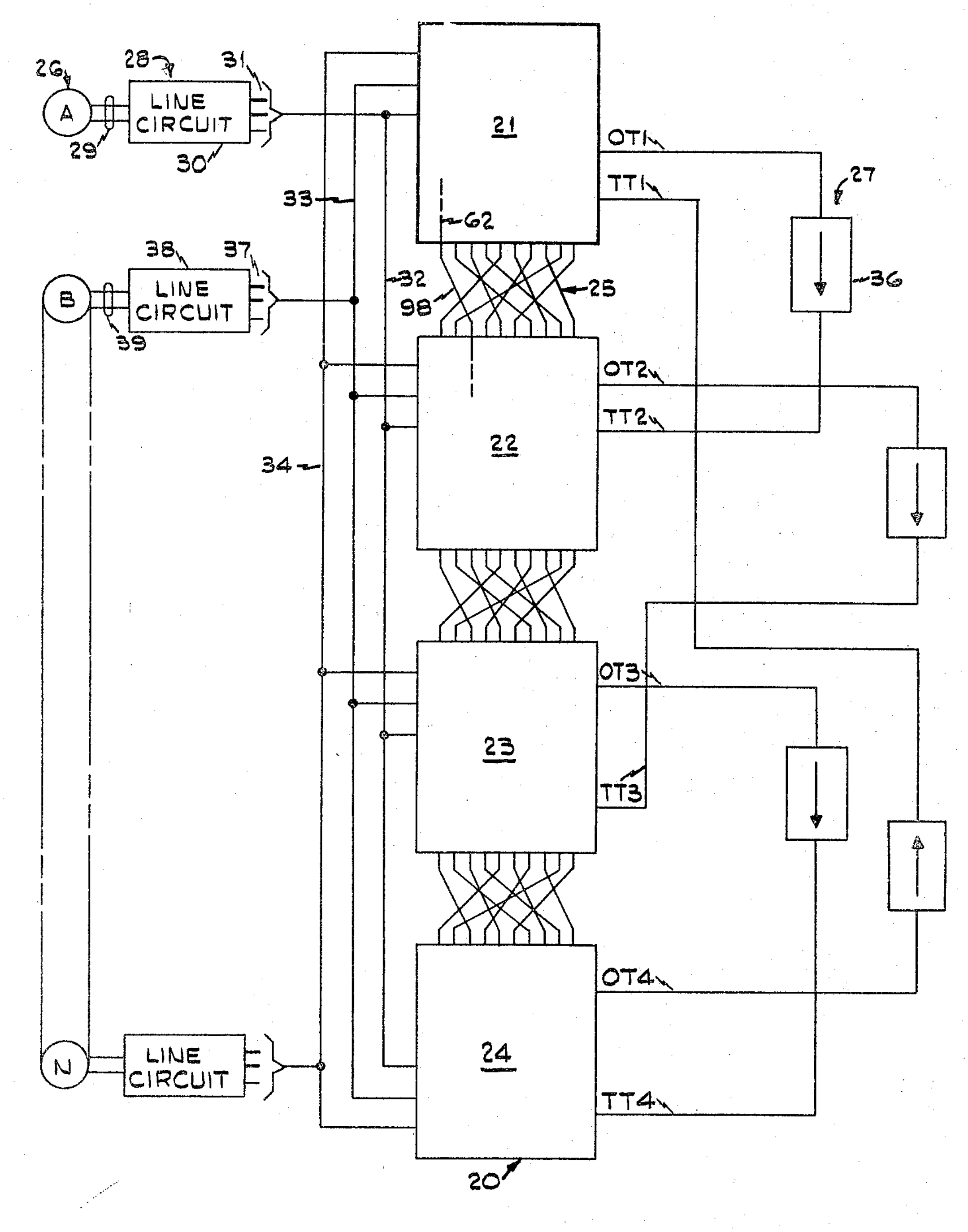
FIG. 1 shows in block diagram form a telephone system utilizing the invention.

FIG. 1 shows an exemplary telephone system utilizing a network 20 of crosspoint contacts, here shown as distributed over four switches 21–24 such as crossbar switches for example. These switches are slip multipled together in any suitable fashion with one exemplary pattern shown at 25. Thus, the network is constructed as a unitary device and every crosspoint has at least one appearance in each of the switches 21–24; although each crosspoint does not necessarily appear in the same geometrical spot on every switch.

Subscriber lines 26 are connected to one side of the network 20, and control equipment 27 is connected to the other side of the network 20. Each subscriber line connection is extended via an individually associated line circuit 28. For example, the subscriber line A is connected via two wires 29 to an individually associated line circuit 30. The line circuit 30 is connected via three wires 31 to each of the switches 21–24 via a multiple 32. The heavily inked wires in group 31 indicate the well known tip and ring conductors, and the lightly inked wires indicate the equally well known sleeve conductor. In like manner, subscriber lines B through N are connected to the four switches 21–24 via the multiples 33, 34, respectively. The letter "N" indicates that any number of lines may be so connected.

Each of the control equipments 27 may take any suitable form; however, the invention contemplates use of junctor or link circuits of types which are well known in automatic telephony. For example, conventional crosspoint systems often use junctors of the type described. In general, each junctor is a one-way device (as indicated by the arrow enclosed therein) for extending connections from an originating trunk (OT) to a terminating trunk (TT). The various junctors are connected to the various switches and to any other suitable equipment processing a call, such as registers, in any manner known to those skilled in the art.

The system operates this way calling subscriber (such as one at station A) removes a receiver or handset, thereby completing a loop circuit across the conductors 29. Responsive thereto, line circuit 30 places a demand on the switching network 20 as, for example, by marking its sleeve conductor. This marking causes any available one of the switches 21–24 to complete a circuit to an idle and available originate trunk OT. In this particular call, it may be assumed that the switch 21 responds to the sleeve marking by connecting lines 31 to junctor 36 via an originate trunk OT1. Junctor 36 (or a register—not shown) returns dial tone over this originate trunk OT1 through switch 21 to line A. After this, the calling subscriber dials a wanted number, and junctor 36 further extends the connection over its terminate trunk TT2 to switch 22. In any well known manner, a crosspoint then closes in switch 22 to complete a connection to the called subscriber line. If, for example, subscriber A dialed the directory number of subscriber line B, this connection is completed over multiple 33, lines 37, line circuit 38, and conductors 39 to subscriber line B. Thereafter, the junctor 36 transmits a ringing current to subscriber line B, receives answer supervision, and holds the connection for the duration of the call. After the call is over and the subscribers hang-up, junctor 36 releases the connection through the switches 21, 22, and the circuit returns to normal.

The invention relates to the manner in which the various switches 21–24 are used as will become apparent from a study of the remaining drawings. However, so that these drawings may be better understood, reference is made to FIGS. 2 and 3 which relate physical components of a crossbar switch to the electrical symbology used elsewhere in the drawings.

Figure 2:
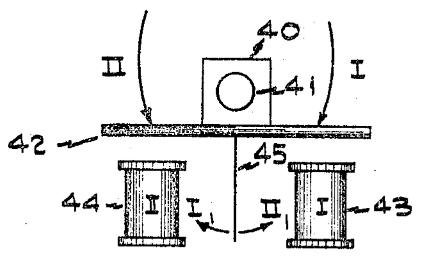
FIG. 2 shows an elevational end-view of a select mechanism of a crossbar switch.

FIG. 2 shows an end view of a portion of a well known crossbar switch. Here a select rod 40 is mounted to turn on a bearing 41. Attached to the select rod 40 is an armature 42 positioned to be attracted by either of two select coils 43, 44. Thus, if select coil 43 is energized, armature 42 rotates on bearing 41 in the direction of arrow I. This, in turn, deflects a select finger 45 in the direction of arrow $I_1$. If, on the other hand, select coil 44 is energized, armature 42 rotates about bearing 41 in the direction of arrow II. This causes the select finger 45 to move in the direction of the arrow $II_1$.

Figure 3:
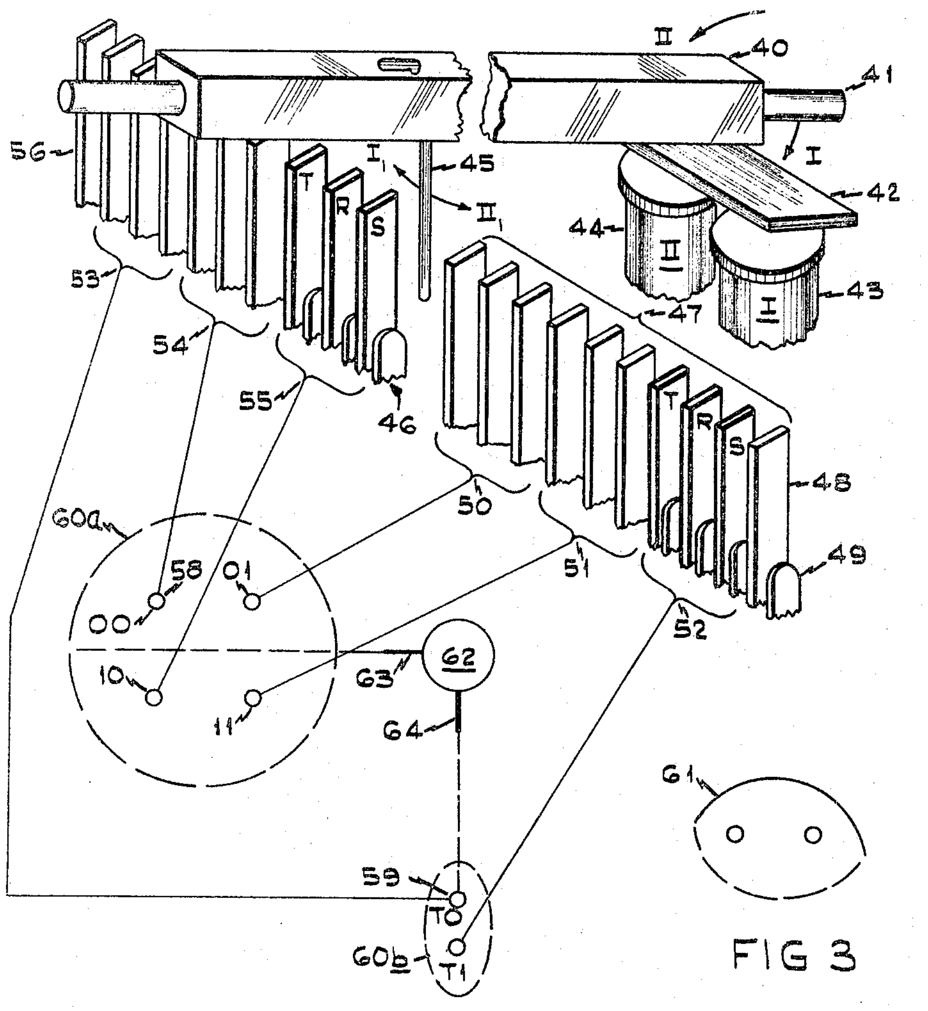
FIG. 3 shows a pictorial view of the select mechanism of FIG. 2 working in conjunction with spring contact pile-ups.

FIG. 3 is a perspective view relating the mechanism of FIG. 2 to electrical contacts at a particular crosspoint. By comparing the reference numerals (which identify the same parts) in FIGS. 2 and 3 the reader will readily understand that energization of select coil 43 ultimately results in closure of a set of contacts 46. In like manner, energization of the select coil 44 ultimately closes the contacts 47. Contacts 46 and 47 (which have the same physical construction) comprise a single crosspoint.

Consider the construction of contacts 47 by way of example. These contacts constitute a pile-up of ten sets of contact springs. An exemplary set includes a movable contact 48 and a stationary contact 49. Before operation of the crosspoint, these two contacts are electrically isolated from each other. After operation of the crosspoint, contacts 48, 49 touch each other and thereby complete an electrical circuit. To avoid unduly complicating FIG. 3, not all of the stationary contacts such as 49 are shown; however, it should be understood that every movable contact has a stationary contact associated therewith. Also, it should be understood that the contacts of FIG. 3 are shown horizontally disposed only as a generalized and stylized showing. Those familiar with crossbar switch construction will readily perceive how this showing relates to the crosspoints on their particular crossbar switch.

The ten sets of contacts 47 are divided into three groups 50–52 of contacts each including three sets of contact springs. Each group of contact springs includes tip, ring and sleeve contacts (as designated in group 52 by the letters T, R, and S). The tenth set of contact springs 48, 49 are spares which may be used for any desired control function. It should now be apparent that contacts 46 also include three similar groups of contacts 53–55 with an extra or spare set of contacts at 56.

Portions of FIG. 3 are symbols which also appear in FIG. 4 as indicated by the usage of the same reference numerals. These symbols include small circles which represent inlet or outlet wires. For example, circle 58 may be thought of as a cross-section view of the multiple 32 in FIG. 1. In like manner, the small circle 59 may be thought of as a cross sectional view of trunk OT1. These same small circles are also shown in FIG. 4 as enclosed by correspondingly numbered dot-dashed lines 60*a*, 60*b*, and 61. A designator, comprising a circle 62 having two ticks 63, 64 symbolically represents a switch vertical. The circle 62 collectively indicates the stationary contacts in groups 46, 47. The tick 63 indicates means for selecting a line; for example, this means may select between the contacts of groups 54 and 55. In like manner, the tick 64 indicates means for selecting a connection to a trunk. However, the designator 62–64 can not have any effect on any of the circuits in the dot-dashed circle 61 which are shown in FIG. 4 in association with the switches 23, 24.

Thus, when the finger 45 swings in the direction of the arrow $I_1$, a group of contacts 55 close to complete tip, ring and sleeve connections for a line having the directory number 10. Another group of contacts 54 close to complete similar connections for a line having a directory number 00. The group of contacts 53 close to complete tip, ring and sleeve connections for a trunk T0 which may be the trunk OT1 of FIG. 1, for example. In like manner, if the finger 45 swings in the direction $II_1$ contacts 50 complete connections for line 01; contacts 51 complete connections for line 11; and contacts 52 complete connections for trunk T1 (which may be trunk TT1 of FIG. 1, for example).

With the above description of how FIG. 4 is to be read, the reader may now determine how the four switches 21–24 control the various crosspoints. For example, switch 21 is shown as comprising ten verticals one of which is indicated symbolically, by the vertical designator 62. Lines 00 to 20 connected to the switch inlets are associated with vertical 62 for connection through the switch to the switch outlets. Whenever any designator is operated only one set of line contacts in any group will be effective. When, for example, designator 62 operates, it is as if tick 63 moves upward or downward. If the I select coil 43 is energized, contacts 54, 55 (FIG. 3) operate to connect lines 00 and 10, in circle 60*a*, through to the switch outlets. The choice of whether line 00 or line 10 is selected depends on which of two horizontal select magnets is energized. If the designator is operated in the other direction, it is as if one of the sets of contacts immediately below tick 63 is selected. Again, the final selection is responsive to which of two horizontal coils is energized. In a similar manner, the tick 64 indicates that a selected trunk T0 or T1 is finally connected to switch outlets responsive to the energization of a horizontal select coil.

FIG. 4 symbolically shows at 65 that each switch is comprised of ten verticals. Twenty lines 00–19 are connected in multiple to two verticals 62, 66 on switch 21. These same twenty lines 00–19 connect to a similar two verticals on switch 22. The subscriber lines are associated with the verticals so that four lines may be connected to each vertical at each crosspoint. Ten trunks are also associated with each vertical, with two trunks connected at each crosspoint. As indicated by the placement of the small trunk indicating circles in FIG. 4 (e.g. 59) each of the trunks is connected in multiple to five verticals in each switch. There are five of the above described crosspoints per vertical. In addition, there are two other crosspoints for selecting between the four lines and two trunks appearing at the crosspoints. Thus, the switch may be described as having seven horizontal levels.

In greater detail on switch 21 for example, twenty subscriber lines 00–19 are connected in multiple to verticals 62, 66. Lines 00, 01, 10, 11 are multiply connected to verticals 62, 66 of switch 21 at a first horizontal level 67. Lines 02, 03, 12, 13 are multiply connected to verticals 62, 66 at a second horizontal level 68. Other lines 04–09 and 14–19 are connected in a like manner at the third through fifth levels.

Trunks T0–T9 are multiply connected to each of five verticals 62 and 70–73 with two trunks connected to each of five different horizontal levels. Thus, trunks T0, T1 may be connected to each of the five verticals 62, 70–73 at the first horizontal level 67. Trunks T8, T9 may be connected to the same five verticals at the fifth level. In this manner, eighty trunks are connected to one hundred lines with the lines and trunks connected to the same verticals.

Means are provided for integrating primary and secondary switching functions in each of the multiswitches. In greater detail, automatic multiswitches are provided with vertical and horizontal paths. Inlets are connected to some of these horizontal paths which function as the primary stage. Outlets are connected to other of these horizontal paths which function as the secondary stage. Each switch therefore, provides both primary and secondary stages. The vertical paths form part of the interstage primary to secondary connections. The structure for accomplishing these ends will be best understood by reference to FIG. 5.

FIG. 5 may be related to FIG. 4 in the following manner. The indicator circle 62 may be thought of as a cross-section view of a bundle of conductors which are shown by the lines 75–84. The tick 63 represents the line selecting contacts 85–90, and the tick 64 represents the trunk connecting contacts 91–93. That is, if coil 95 is energized, contacts 85–87 close to select conductors 75–77. If coil 96 is energized, contacts 88–90 close to select conductors 78–80. Finally, if coil 97 is energized, contacts 91–93 close to select conductors 81–83. FIG. 5 may be related to FIG. 3 in a manner which will be obvious by comparing the reference numerals 50, 51, 54, 55. As will become more apparent, the contacts associated with conductors 75–80 may be termed a "primary stage" and contacts associated with conductors 81–83 may be termed a "secondary stage."

A manner of actually connecting the lines (primary) to the trunk (secondary) is shown in FIG. 5, where verticals on each of two switches 21, 22 are interconnected via cable 98. Each vertical is shown as comprised of ten conductors 75–84. The first three conductors 75–77 are used for connecting the tip, ring, and sleeve leads of lines 00 to 09; the next three conductors 78–80 are used for connecting the tip, ring, and sleeve leads of lines 10–19; the next three conductors 81–83 connect the tip, ring, and sleeve leads of trunks T0–T9. Conductor 84 is the spare. The manner of connecting the remaining hundred lines through other verticals should now be apparent.

Seven select bars 40 and 101–105 are shown for controlling each of the seven horizontal levels. Each select bar is controlled by two select coils of the type previously described with reference to FIGS. 2, 3. For example, select coils 43, 44 are shown as controlling the select bar 40. These two coils select between the lines 00, 10, and 01, 11 respectively, and between the trunks T0 and T1. To further indicate that the schematic representation of FIG. 5 is the same as the pictorial representation of FIGS. 2, 3 the contacts are shown having the same reference numbers 50–56.

Each vertical, such as vertical 62 on switch 21, is enabled when a hold coil (not shown) is energized. Subsequently a select coil such as 43 is operated to select two sets of line contacts out of four such sets of line contacts. Also a select coil such as either select coil 95 or 96 in horizontal level seven is operated to close contacts 85–87 or 88–89 to select one of the two operated sets of line contacts.

It should be noted that the energization of a select coil, such as 43, also connects the selected trunks to the vertical multiple. This connection, however, is completed from switch 21 to switch 22 only when the select coil 97 in horizontal level six is energized to close contacts 91–93.

FIG. 5 also shows how two switches are connected together. The tip, ring, and sleeve leads 106 of the lines of switch 21 are connected to the tip, ring, and sleeve leads 107 of the trunks of switch 22 through cable 98. In a similar manner the tip, ring, and sleeve conductors 108 of the lines of switch 22 are connected to the tip, ring, and sleeve conductors 109 of the trunks on switch 21.

In operation, line 00 is connected to trunk T20 (for example) when the vertical hold coil (not shown) associated with vertical 62, on switch 21 is energized. Select coils 43 and 95 are energized. Responsive to the energization of select coil 43 the contacts 54 close to connect line 00 to associated conductors 75–77. Responsive to the energization of select coil 95, contacts 85–87 close to connect the conductors 75–77 the tip, ring, and sleeve outlets 106, cable 98 and the trunk tip, ring, and sleeve input conductors 107 on switch 22. On switch 22 the hold coil (not shown) associated with the vertical shown is also energized as are select coils 111, 112. Responsive to the energization of coils 111 and 112 contacts operate to connect line 00 to trunk T20 over an obvious path. It should be observed that the explanation of the connection between switches 21 and 22 was made only by way of example.

FIG. 6 shows a preferred plan for slip multiple coupling between the switches. Therein, line 114, 115 represent the interswitch cabling for the two verticals serving the twenty lines 00 to 19 and the ten trunks T0–T9. Lines 116, 117 represent the interswitch cabling for the two verticals serving the next twenty lines 20–39 and trunks T0–T9 connected in multiple to the next two verticals. In a similar manner the rest of the verticals serving lines and trunks are connected from switch 21 to switch 22. Thus, the verticals are interconnected according to the following table:

| Switch 21 Vertical | Switch 22 Vertical |
|---|---|
| 1 | 3 |
| 2 | 7 |
| 3 | 5 |
| 4 | 9 |
| 5 | 1 |
| 6 | 8 |
| 7 | 4 |
| 8 | 10 |
| 9 | 2 |
| 10 | 6 |

The advantages of this system should now be apparent to those skilled in the art. For example, the system as disclosed uses four switches 21–24 where prior art exchanges required eight switches. The grouping described herein provides for establishing connections via ten verticals for each subscriber line by using only four multiswitches having a total of forty verticals. This efficient grouping is accomplished by the dual utilization of the verticals for connecting both subscriber lines and trunks. It will be obvious to those skilled in the art that an arrangement of this type provides a loading of the verticals which is considerably greater than that possible in prior arrangements utilizing separate primary and secondary switches.

While the principles of the invention have been described herein in connection with a specific embodiment, it is to be clearly understood that this description is made only by way of example and not as a limitation to the scope of the invention.

We claim:

1. A telephone system comprising a plurality of subscriber lines and interstage trunks connected to a switching network, said network comprising rows and columns of switches arranged in crosspoints with a plurality of said switches at each of said crosspoints, said rows being assembled into a number of switching levels, there being at least two of said rows in each of said levels, said columns being arranged into a number of multiples, there being at least two of said columns in each of said multiples, whereby said plurality of switches located at each of said crosspoints comprise at least four switches per crosspoint, a plurality of inlets and outlets for said network distributed over said rows, said lines being connected to said inlets, said trunks being connected to said outlets, means comprising said columns of switches for causing the rows connected to said inlets to function as a primary switching stage and said rows connected to said outlets to function as a secondary switching stage, means comprising certain of said levels for selecting one of the four switches at each operated one of said crosspoints to effectively complete a particular electrical circuit and means whereby said particular electrical circuit is completed from an inlet through a first of said rows, over a column, and out a second of said rows to an outlet, thus completing a path between a selected one of said inlets and a selected one of said outlets.

2. A telephone system comprising a plurality of subscriber lines and interstage trunks connected to a switching network, said network comprising a group of interconnected multiswitches, each switch having intersecting vertical and horizontal paths, crosspoint switching means associated with said paths for selectively interconnecting any of said vertical paths with any of said horizontal paths at the intersection thereof, said lines being connected to a first group of horizontal paths, said trunks being connected to a second group of said horizonal paths, and means comprising said vertical paths for causing said first group of horizontal paths to function as a primary switching stage and said second group of horizontal paths to function as a secondary switching stage.

3. The system of claim 2 wherein each of said crosspoints simultaneously closes a plurality of connections, and means comprising still other of said horizontal paths for selecting between the connections closed at any particular crosspoint.

4. A telephone system comprising a unitary switching network of crosspoint contacts distributed over a plurality of crossbar switches each of said switches having first and second intersecting multiples, a plurality of subscriber lines connected to one side of said network via the first multiple in each of said switches, control equipment connected to the other side of the network also via said first multiple in each of said switches, and means comprising the second multiples in each of said switches for interconnecting said crossbar switches to provide said unitary network wherein the second multiple in any one switch is electrically identical to a corresponding second multiple in at least one other of said switches.

5. The telephone system of claim 4 and a plurality of subscriber stations individually associated with the lines extending to said first multiple in each of said switches, a plurality of interstage trunks for completing the connection from said network to said equipment, and crosspoint switching means operated responsive to signals received from said stations for selectively connecting at least one of said lines to a second multiple in said one switch and one of said trunks to the corresponding second multiple in said other switch, whereby said switching net work effectively uses said second multiples for connecting said one line to said one said trunk.

6. A telephone exchange system comprising a plurality of subscriber lines, and a plurality of trunks, exchange means for interconnecting said lines and trunks, said exchange means comprising a plurality of multiswitches, each of said multiswitches having intersecting horizontal and vertical paths, said lines connected to first group of said horizontal paths, said trunks connected to a second group of said horizontal paths, first selector means for selectively connecting said first group and said second group of horizontal paths to the same ones of said vertical paths, second selector means for selectively connecting each of said vertical paths to line outlets and to trunk outlets, and means for interconnecting the trunk outlets and line outlets of the different switches to thereby selectively connect the lines to the trunks.

7. The telephone exchange system of claim 6 wherein said vertical paths comprise at least three groups of three conductors.

8. The telephone exchange system of claim 7 wherein each of said groups of conductors comprises tip, ring and sleeve wires.

9. The telephone exchange system of claim 8 wherein said horizontal paths are arranged at horizontal levels, certain levels comprising at least one of said first group and one of said second group of horizontal paths, said first selector means comprises select bar means at each of said certain levels, and wherein the second selector means comprises select bar means at other horizontal levels.

10. The exchange system of claim 9 wherein there are four multiswitches each comprising ten vertical paths and seven horizontal levels, and said seven horizontal levels comprising five certain horizontal levels and two other horizontal levels.

References Cited by the Examiner

UNITED STATES PATENTS

| | | | |
|---|---|---|---|
| 2,253,743 | 8/1941 | Wicks | 179—22 |
| 3,048,662 | 8/1962 | Haigh et al. | 179—22 |

KATHLEEN H. CLAFFY, *Primary Examiner.*

WILLIAM C. COOPER, *Examiner.*